United States Patent
Matsuno et al.

(10) Patent No.: US 7,426,330 B2
(45) Date of Patent: Sep. 16, 2008

(54) RECORDING DEVICE AND RECORDING METHOD

(75) Inventors: Katsumi Matsuno, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 10/481,195

(22) PCT Filed: Apr. 9, 2003

(86) PCT No.: PCT/JP03/04524

§ 371 (c)(1), (2), (4) Date: Dec. 17, 2003

(87) PCT Pub. No.: WO03/088246

PCT Pub. Date: Oct. 23, 2003

(65) Prior Publication Data

US 2004/0190877 A1    Sep. 30, 2004

(30) Foreign Application Priority Data

Apr. 18, 2002    (JP) .............................. 2002-115953

(51) Int. Cl.
H04N 5/91    (2006.01)
H04N 9/79    (2006.01)

(52) U.S. Cl. .......................................... 386/46; 386/35

(58) Field of Classification Search ................... 386/1, 386/33, 46, 45, 111–112, 125–126
See application file for complete search history.

(56) References Cited

U.S. PATENT DOCUMENTS

| 4,982,390 A | * | 1/1991 | Tanaka ........................ 369/83 |
| 5,745,783 A | | 4/1998 | Suzuki et al. |
| 6,430,363 B2 | * | 8/2002 | Sasaki et al. ................. 386/112 |
| RE37,994 E | * | 2/2003 | Fukuda et al. .............. 386/112 |
| 6,772,284 B2 | * | 8/2004 | Ikeda ........................... 711/113 |

FOREIGN PATENT DOCUMENTS

| EP | 0 618 695 | 10/1994 |
| EP | 0 837 469 | 4/1998 |
| EP | 0 858 171 | 8/1998 |

(Continued)

OTHER PUBLICATIONS

Patent Abstracts of Japan, publication No. 08-124294, publication date: May 17, 1996, application No. 06-262518, applicant: Canon Inc., Date of filing: Oct. 26, 1994, Inventors: Suzuki Takatoshi et al.

(Continued)

*Primary Examiner*—Thai Tran
*Assistant Examiner*—Tat Chi Chio
(74) *Attorney, Agent, or Firm*—Frommer Lawrence & Haug LLP; William S. Frommer; Paul A. Levy

(57) ABSTRACT

The present invention is applied to a video data recording apparatus having an interface with a computer. The buffer size of a recording buffer 17A for temporarily storing data and recording the data on a recording medium 18 is switched between a mode for recording data through an interface 24 with a computer and a mode for recording steaming data D11 such as video data or the like.

1 Claim, 10 Drawing Sheets

FOREIGN PATENT DOCUMENTS

| | | |
|---|---|---|
| EP | 0 866 460 | 9/1998 |
| EP | 1 063 842 | 12/2000 |
| JP | 7-319630 | 12/1995 |

OTHER PUBLICATIONS

Patent Abstracts of Japan, Publication No. 10-333984, publication date: Dec. 18, 1998, application No. 09-141926, applicant: Matsushita Electric Ind. Co. Ltd, Date of filing: May 30, 1997, Inventors: Ayaki Yasushi et al.

Patent Abstracts of Japan, publication No. 02-008928, publication date: Jan. 12, 1990, application No. 63-158991, applicant: Hitachi Ltd, Hitachi Comput Eng. Corp. Ltd, Date of filing: Jun. 27, 1988, Inventor: Ogata Mikito et al.

\* cited by examiner

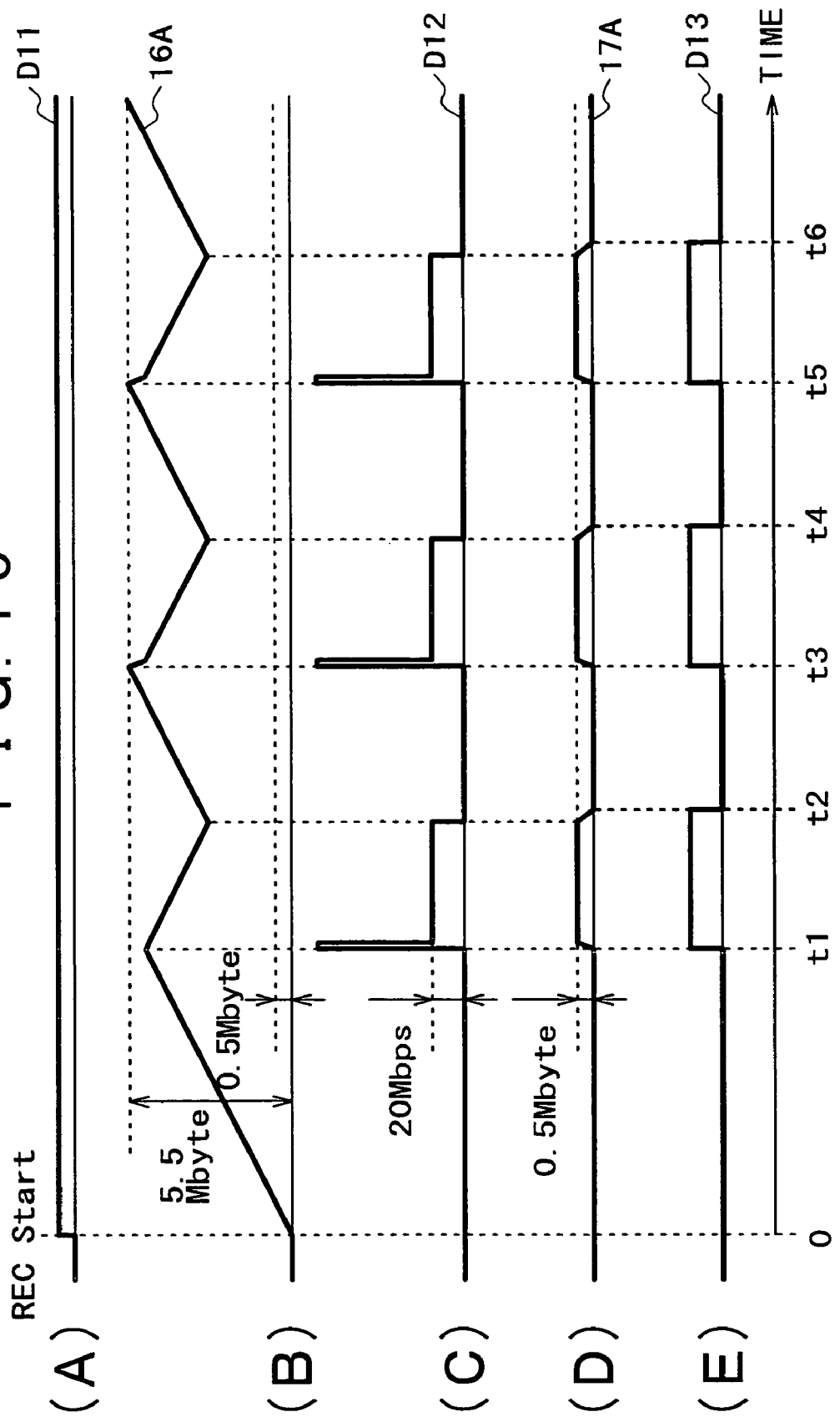

RECORDING DEVICE AND RECORDING METHOD

TECHNICAL FIELD

The present invention relates to a recording apparatus and a recording method, and can be applied, for example to a video data recording apparatus having an interface with a computer. According to the present invention, the buffer size of a recording buffer for temporarily storing data and recording the data on a recording medium is switched between a mode for recording data through an interface with a computer and a mode for recording streaming data such as video data or the like, thereby reducing the capacity of the buffer memory even if it is arranged to be able to input data to and output data from the computer to increase its affinity with the computer.

BACKGROUND ART

Heretofore, video tape recorders combined with cameras are arranged to record video data that have been produced by imaging a desired subject on a recording medium which includes a magnetic tape. In recent years, various recording apparatus using disk-shaped recording mediums such as hard disks or the like have been proposed as a replacement for magnetic tapes.

There have been available various interfaces that are widely used in information processing apparatus such as computers or the like. It has been considered that recording and reproducing apparatus which incorporate disk-shaped recording mediums such as hard disks or the like may be simply constructed by using such existing interfaces. Using those interfaces, recording and reproducing apparatus can be simply constructed so as to be able to input and output video data to and from personal computers, thus allowing the recording and reproducing apparatus to find an increased range of applications.

With the recording and reproducing apparatus being thus arranged, however, a large-capacity buffer memory needs to be provided for the transfer of data to the recording and reproducing apparatus.

FIG. 1 of the accompanying drawings is a block diagram showing a flow of video data in a recording apparatus for recording video data. In order to achieve a sufficient level of image quality based on video data that are compressed by MPEG (Moving Picture Experts Group), it is necessary to transfer the video data at a rate of about 10 [Mbps]. In the arrangement shown, an encoder 2 outputs video data as streaming data at the rate of about 10 [Mbps].

A disk-shaped recording medium such as a hard disk or the like records the video data intermittently thereon at a data transfer rate that is about twice the data transfer rate of the video data output from the encoder 2 because the recording medium 3 needs various processing modes including a rotation waiting mode, a seeking mode, and a retrying mode. Therefore, when video data are output as streaming data at the rate of 10 [Mbps] from the encoder 2, the video data are transferred to the recording medium 3 at a data transfer rate of 20 [Mbps] at maximum.

The video data are transferred to and from a personal computer (PC) 4 through an interface (I/F) 5 according to IEEE (The Institute of Electrical and Electronics Engineers, Inc.) 1394 or USB (Universal Serial Bus), and transferred to and from a recording and reproducing apparatus which uses the recording medium 3 through an interface which includes an ATAPI (AT Attachment Packet Interface) for performing a trouble-free data exchange with the interface according to IEEE 1394. The recording and reproducing apparatus which uses the recording medium 3 requires a buffer memory having a capacity of about 4 [Mbytes] in order to reduce the frequency of data transfer to and from the personal computer 4 connected by the interface 5 for thereby preventing the processing efficiency of the personal computer 4 from being lowered. The ATAPI interface has a data transfer rate of 100 [Mbps].

When video data output from the encoder 2 are recorded on the recording medium 3, the amount of transferred data varies as shown in FIG. 2 of the accompanying drawings in a system buffer 6 that is connected to the encoder 2 and the ATAPI interface and a drive buffer 7 that is connected to the recording medium 3. In FIG. 2, the data output from the encoder 2, the data output from the system buffer 6, and the data output to the recording medium 3 are represented D1, D2, D3, respectively. In FIG. 2, the assembly is in an ideal state where the rotation waiting mode and other modes are ignored in the recording and reproducing apparatus.

When video data start to be recorded (REC Start), compressed video data D1 are output as streaming data at 10 [Mbps] from the encoder 2 ((A) in FIG. 2). The system buffer 6 and the drive buffer 7 accumulate the video data D1 and intermittently outputs the accumulated video data D1 ((B) to (E) in FIG. 2). Specifically, when the video data have been accumulated to a predetermined amount in the system buffer 6 (at time t1), the data accumulated in the system buffer 6 are transferred to the drive buffer 7 at 100 [Mbps] (in a period from time t1 to time t2), which start recording the data on the recording medium 3 at 20 [Mbps].

When the amount of data accumulated in the system buffer 6 and the drive buffer 7 are reduced to a certain level, then the system buffer 6 and the drive buffer 7 stop sending out the data. This processing sequence will subsequently be repeated.

If the drive buffer 7 has a storage capacity of 4 [Mbytes], then since the drive buffer 7 outputs the video data that are input thereto at the data transfer rate of 100 [Mbps] to the recording medium 3 at the data transfer rate of 20 [Mbps], the data transfer rate at which the video data are input to the drive buffer 7 is greater than the data transfer rate at which the video data are output from the drive buffer 7, and hence the video data are progressively accumulated in the drive buffer 7. Specifically, in 0.5 [sec.] from time t1, the video data are accumulated in the drive buffer 7 to the amount of 4 [Mbytes], whereupon no empty storage area is available in the drive buffer 7. At this time, the system buffer 6 needs to stop outputting the video data.

After the video data have started to be recorded until the system buffer 6 stops inputting the video data to the drive buffer 7, the system buffer 6 has recorded 5 [Mbytes] of video data at maximum. Therefore, if it is assumed that the overall assembly operates in an ideal condition, then the system buffer 6 is required to have a storage capacity of at least 5 [Mbytes].

FIG. 3 of the accompanying drawings shows a situation in which an error has occurred while video data are being recorded on the recording medium 3, and the video data stored in the system buffer 6 is to be re-transmitted. Since the system buffer 6 has to store the video data to be re-transmitted, the system buffer 6 requires a large storage capacity. In the example shown in FIG. 3, the video data sent from time t1 to time t2 are retried at time t3 or later, and the system buffer 6 needs to have a storage capacity of 9 [Mbytes].

Therefore, if the large-capacity drive buffer is employed so as to be able to input data to and output data from the computer for increased affinity with the computer, the buffer memory (system memory) for supplying streaming data to the drive buffer is required to have a storage capacity that is several times greater than the storage capacity of the drive buffer.

DISCLOSURE OF INVENTION

The present invention has been made in view of the above drawbacks, and proposes a recording apparatus and a recording method for reducing the capacity of a buffer memory even if it is arranged to be able to input data to and output data from the computer to increase its affinity with the computer.

To achieve the above proposal, the present invention is applied to a recording apparatus having an interface connectable to a computer, a buffer memory for temporarily storing and outputting streaming data at a data transfer rate that is relatively lower than the data transfer rate of the interface, and a recording means for temporarily storing data output from the buffer memory and the interface in a recording buffer and recording the data on a recording medium. The recording means switches the buffer size of the recording buffer between a mode for recording the data output from the interface on the recording medium and a mode for recording the data output from the buffer memory on the recording medium.

With the arrangement of the present invention, since the invention is applied to a recording apparatus having an interface connectable to a computer, a buffer memory for temporarily storing and outputting streaming data at a data transfer rate that is relatively lower than the data transfer rate of the interface, and a recording means for temporarily storing data output from the buffer memory and the interface in a recording buffer and recording the data on a recording medium, the invention is applicable to a recording apparatus combined with a camera, which is connectable to a computer and serves to record stream data including video data acquired by an imaging means on a recording medium such as a hard disk, an optical disk, or the like. In the above arrangement, the buffer memory for the streaming data is required to resend streaming data stored in the recording buffer in response to a resending request. According to the present invention, the recording means switches the buffer size of the recording buffer between the mode for recording the data output from the interface on the recording medium and the mode for recording the data output from the buffer memory on the recording medium. For recording the streaming data, the buffer size of the recording buffer is set to a smaller size to reduce the amount of streaming data to be resent from the buffer memory in response to a resending request. The buffer memory for the streaming data may thus have a storage capacity that is reduced accordingly.

The present invention is also applicable to recording method of temporarily storing streaming data at a data transfer rate that is relatively lower than the data transfer rate of an interface connectable to a computer, in a recording buffer and recording the streaming data on a recording medium, characterized by switching the buffer size of the recording buffer between a mode for recording the data output from the interface on the recording medium and a mode for recording the data output from the buffer memory on the recording medium.

With the arrangement of the present invention, the recording method allows the buffer memory for the streaming data to have a reduced storage capacity.

BRIEF DESCRIPTION OF DRAWINGS

FIG. 10 is a timing chart showing how the amount of data varies in the buffers when an error has occurred.

BEST MODE FOR CARRYING OUT THE INVENTION

An embodiment of the present invention will be described in detail below with reference to the drawings.

Figure 4:
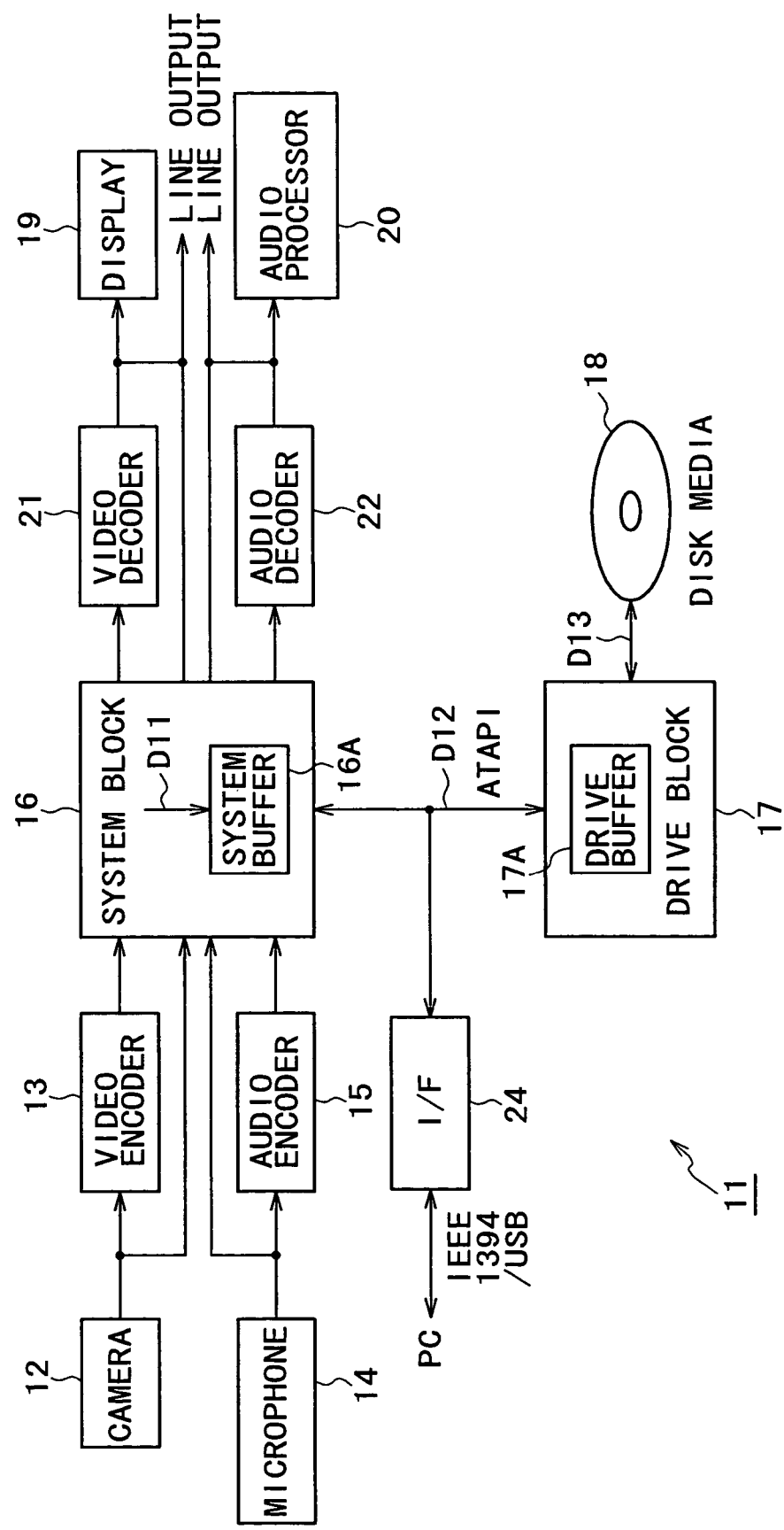
FIG. 4 is a block diagram of a recording apparatus according to an embodiment of the present invention.

(1) Arrangement of the Embodiment:

FIG. 4 is a block diagram of a recording apparatus according to an embodiment of the present invention. The recording apparatus is a portable recording apparatus combined with a camera, including a recording and reproducing system which employs a hard disk drive, rather than a recording and reproducing system which employs a magnetic tape in a conventional video tape recorder combined with a camera.

In the recording apparatus 11, a camera 12 images of a desired subject through a lens and outputs video data of the captured image. A video encoder 13 compresses the video data produced by the camera 12 in a format of MPEG, for example, and outputs the compressed video data. A microphone 14 picks up an audio signal, amplifies the audio signal, and outputs the audio signal as a digital signal. An audio encoder 15 compresses the digital audio signal and outputs the compressed audio signal.

In a mode for recording the captured image, a system block 16 processes the video data output from the video encoder 13 and the audio data output from the audio encoder 15 according to a time-division multiplexing process. The system block 16 generates streaming data at 10 [Mbps] according to the time-division multiplexing process, and outputs the streaming data via a system buffer 16A to a drive block 17. The system block 16 also outputs the video data from the camera 12 and the audio data from the microphone 14 directly to a display 19, an audio processor 20, and line outputs for monitoring purposes. In a mode for reproducing the recorded captured image, the system block 16 receives reproduced data from the drive block 17 via the system buffer 16A, separates the reproduced data into video data and audio data, and outputs the video data and the audio data respectively to a video decoder 21 and an audio decoder 22.

For simply monitoring the captured image, the system block 16 outputs the video data from the camera 12 and the audio data from the microphone 14 to the display 19, the audio processor 20, and the line outputs. In the above processes, the system block 16 responds to control actions of the user and outputs various commands to various parts of the drive block 17, and so forth for thereby controlling the overall operation of the recording apparatus 11.

In the reproducing mode, the video decoder 21 expands the video data output from the system block 16 and outputs the expanded video data to the display 19 and the line output. In the reproducing mode, the audio decoder 22 expands the audio data output from the system block 16 and outputs the expanded audio data to the audio processor 20 and the line output.

For monitoring the captured image, the display 19 activates a liquid-crystal display panel with the video data output from the system block 16 for thereby displaying a monitor image of the captured image. In the reproducing mode, the display 19 activates the liquid-crystal display panel with the video data output from the video decoder 21 for thereby displaying a monitor image of the reproduced image. For monitoring the captured image, the audio processor 20 activates speakers or the like with the audio data output from the system block 16 for thereby outputting a monitor audio signal. In the reproducing mode, the audio processor 20 activates the speakers or the like with the audio data output from the audio decoder 22 for thereby outputting a monitor audio signal of the reproduced sound.

The drive block 17 and a hard disk 18 jointly make up a hard disk drive, and records the data output from the system block 16 on the hard disk 18. The drive block 17 also reproduces the data recorded on the hard disk 18 and outputs the reproduced data to an interface (I/F) 24. The drive block 17 transfers the data at a data transfer rate of 20 [Mbps] to record the data on and reproduced the data from the hard disk 18.

Figure 5:
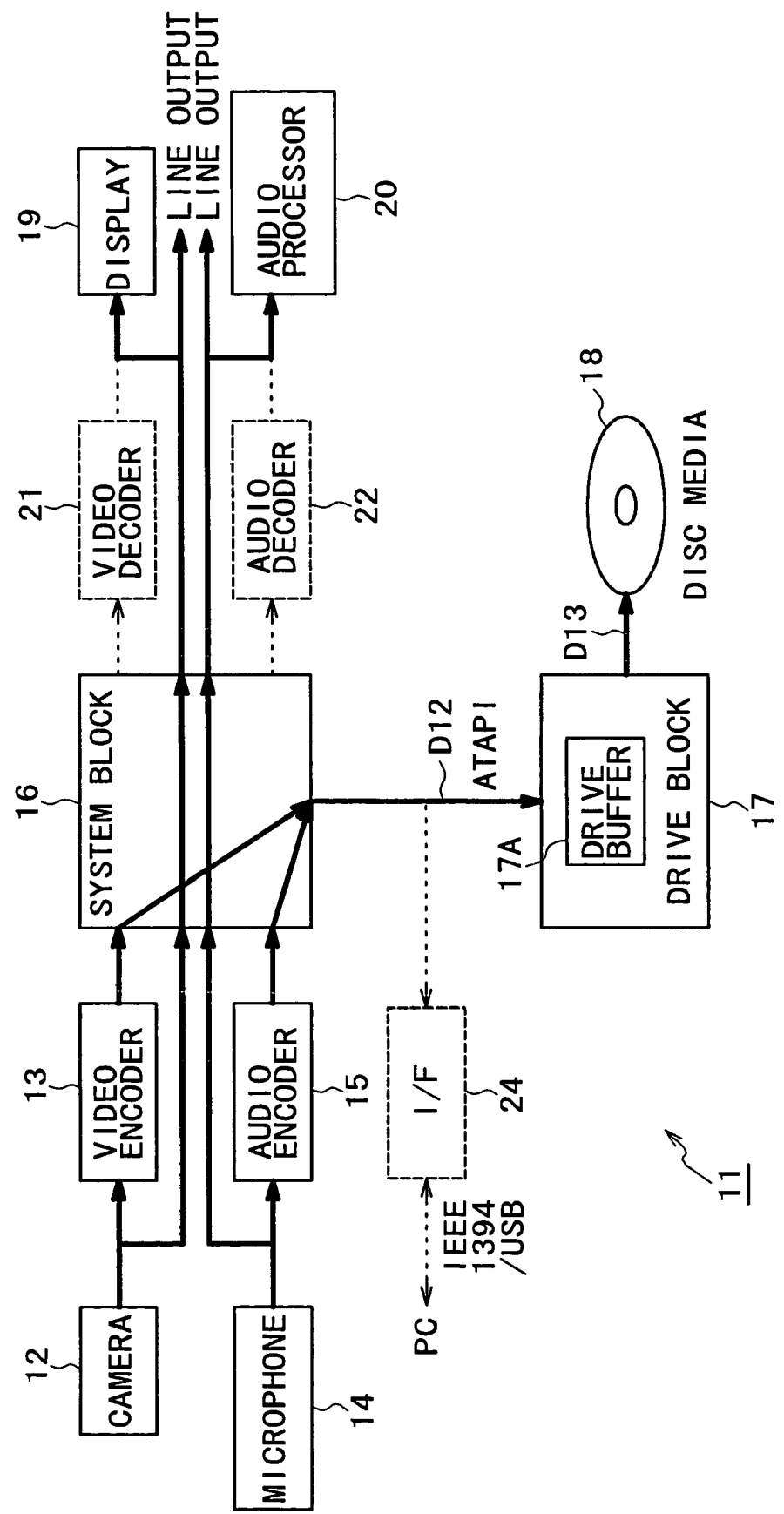
FIG. 5 is a block diagram showing flows of data in a recording mode in the recording apparatus shown in FIG. 4.

As shown in FIG. 5, in the recording apparatus 11, the video data from the camera 12 and the audio data from the microphone 14 are compressed by the video encoder 13 and the audio encoder 15, respectively, the compressed data are processed by the system block 16 according to the time-division multiplexing process, and the resultant streaming data are recorded on the hard disk 18. Concurrent with the above processing, the system block 16 inputs the video data from the camera 12 and the audio data from the microphone 14 to the display 19 and the audio processor 20, respectively, and outputs them from the line outputs for monitoring the captured data.

In the reproducing mode, as shown in FIG. 16, the drive block 17 inputs the reproduced data from the hard disk 18 to the system block 16, which divides the data into video data and audio data that are expanded respectively by the video decoder 21 and the audio decoder 22. The expanded video data and audio data can be confirmed by the display 19 and the audio processor 20 and also by an external device.

The interface (I/F) 24 includes an interface according to IEEE 1394, USB, or the like, and outputs the data output from the drive block 17 to an external device such as a personal computer (PC) or the like.

Figure 7:
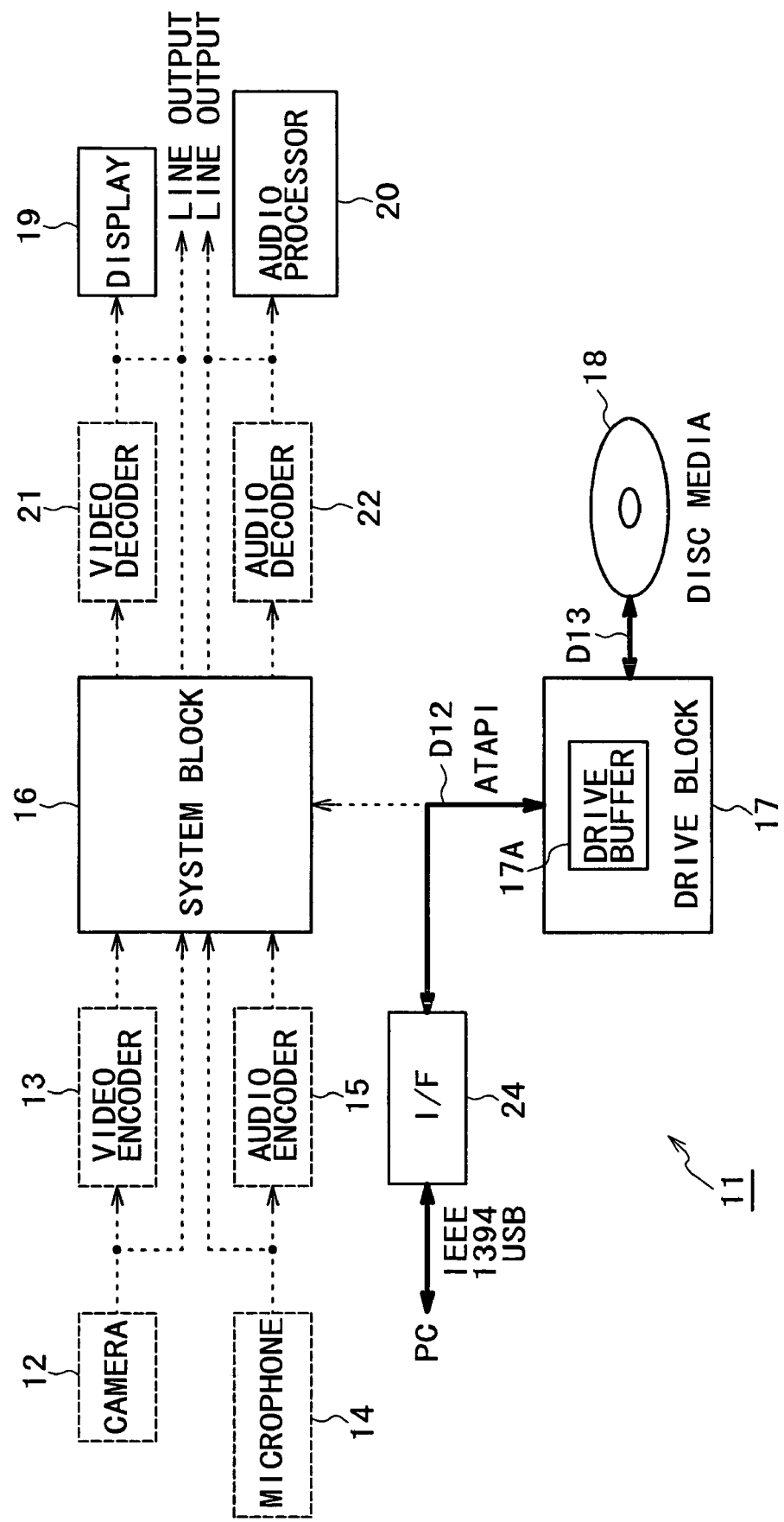
FIG. 7 is a block diagram illustrative of the manner in which data are input and output between the recording apparatus shown in FIG. 4 and a computer.

As shown in FIG. 7, in the recording apparatus 11, the personal computer outputs various commands through the drive block 17 and the interface 24 to the drive block 17 for thereby controlling operation of the hard disk drive to record various data from the personal computer on the hard disk 18 and acquire data recorded on the hard disk 18 at the personal computer.

According to the present embodiment, in the recording apparatus 11, the system block 16, the drive block 17, and the interface 24 are connected by an ATAPI for transferring data therebetween at a data transfer rate of 100 [Mbps]. The drive block 17 has a drive buffer 17A of 4 [Mbytes]. A controller for controlling operation of the drive block 17 performs a processing sequence shown in FIG. 8 to switch between buffer sizes of the drive buffer 17A from a data input destination, so that the system buffer 16A may include a small-capacity memory.

Specifically, when a command for instructing the recording of data on the hard disk 18 is input through the ATAPI to the controller for the drive block 17, control goes from step SP1 to step SP2, which determines whether or not the data are to be recorded in the connected computer, i.e., whether or not the data are to be recorded through the interface 24, depending on an input destination for the data to be recorded.

If the answer is affirmative, then control goes from step SP2 to step SP3 in which the buffer size of the drive buffer 17A is set to 4 [Mbytes], after which control goes to step SP4 to return to the original processing sequence. Conversely, if the answer is negative in step SP2, then control goes from step SP2 to step SP5 in which the buffer size of the drive buffer 17A is set to 0.5 [Mbyte], after which control goes to step SP4 to return to the original processing sequence.

In the recording apparatus 11, therefore, for recording streaming data, the amount of streaming data to be sent again from the system buffer 16A to the drive buffer 17A upon a resending request is reduced by the amount by which the buffer size of the drive buffer 17A is reduced. Thus, the capacity of the system buffer 16A is also reduced.

According to the present embodiment, the interface 24 includes an interface connectable to the computer, and the system buffer 16A includes a buffer memory for temporarily storing and outputting streaming data at a data transfer rate that is relatively lower than the data transfer rate of the interface 24. The drive block 17 includes a recording means for temporarily storing data output from the buffer memory for streaming data and the interface in the drive buffer 17A that serves as a recording buffer, and recording the data on the hard disk 18.

(2) Operation of the Embodiment:

With the above arrangement, in the recording medium 11 (FIGS. 4 and 5), video data representing a captured image and audio data from a subject are acquired from the camera 12 and the microphone 14, respectively, and the video data and the audio data are supplied through the system block 16 to the display 19 and the audio processor 20, respectively, for monitoring the captured image and the sound of the subject.

For recording the captured result on the hard disk 18, a command from the system block 16 is transmitted through the ATAPI interface to the drive block 17 to cause the hard disk drive to switch operation modes. Then, the video data and the audio data output respectively from the camera 12 and the microphone 14 are compressed respectively by the video encoder 13 and the audio encoder 15. Thereafter, the video data and the audio data are processed by the system block 16 according to the time-division multiplexing process, generating streaming data. The streaming data are transmitted through the system buffer 16A and the ATAPI interface to the drive block 17. The drive block 17 records the transmitted data through the drive buffer 17A on the hard disk 18 (FIG. 5).

Figure 6:
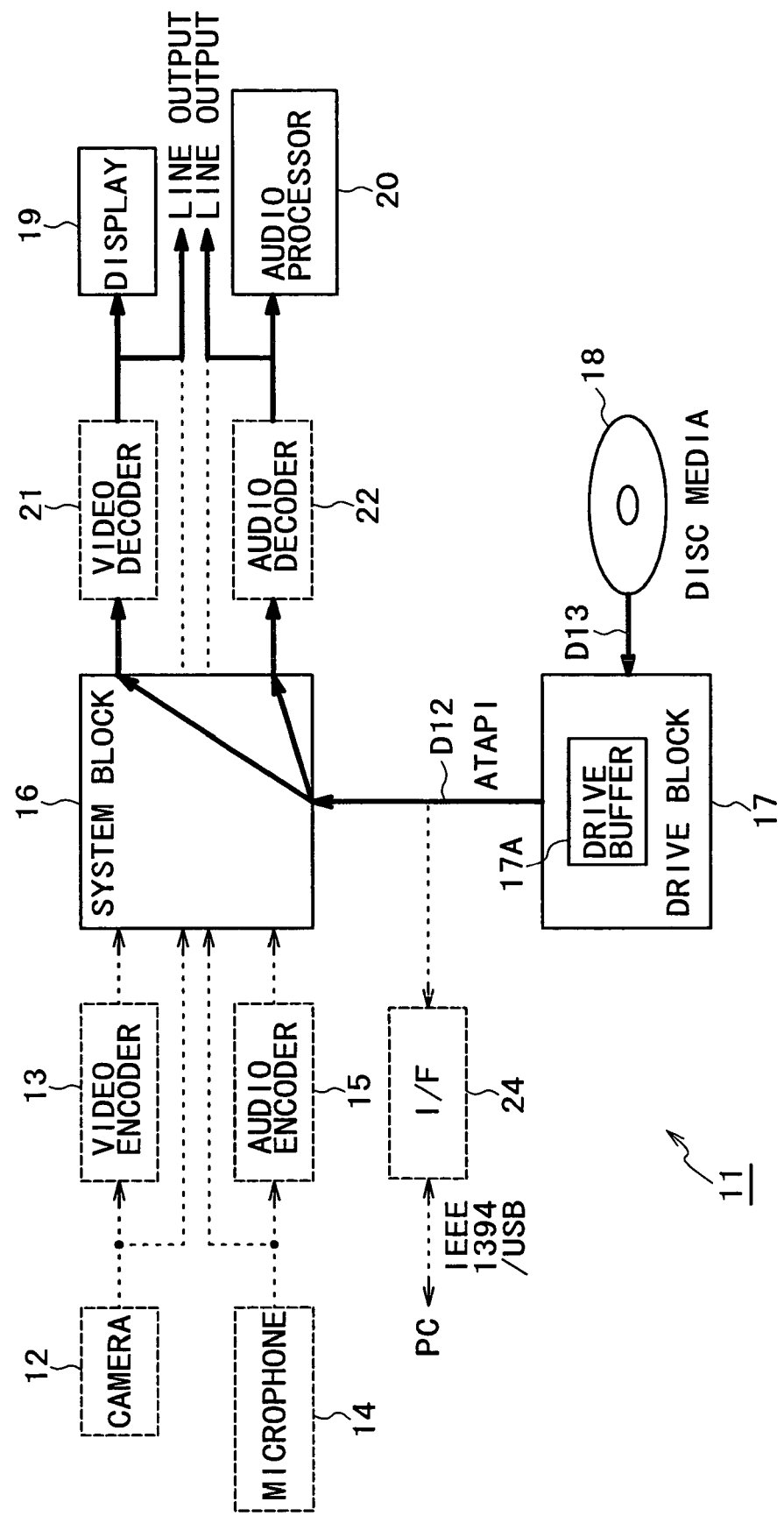
FIG. 6 is a block diagram showing flows of data in a reproduction mode in the recording apparatus shown in FIG. 4.

In the reproducing mode (FIG. 6), a command from the system block 16 causes the drive block 17 to switch its operation modes to reproduce data from the hard disk 18. The reproduced data are input through the drive buffer 17A to the system block 16, which divides the data into video data and audio data that are expanded respectively by the video decoder 21 and the audio decoder 22. The expanded video data and audio data are output to the display 19 and the audio processor 20, respectively.

When the personal computer is to access the hard disk 18 (FIG. 7), the personal computer supplies a command through the interface 24 to the drive block 17, which switches its operation modes. For recording data from the personal computer on the hard disk 18, the corresponding data are output from the personal computer by a response from the drive block 17, input through the interface 24 to the drive block 17, and recorded on the hard disk 18 by the drive block 17. Conversely, for reproducing data recorded on the hard disk 18 and outputting the data to the personal computer, the reproduced data produced when the hard disk 18 is played back are output through the drive block 17 and the interface 24 to the personal computer.

Figure 8:
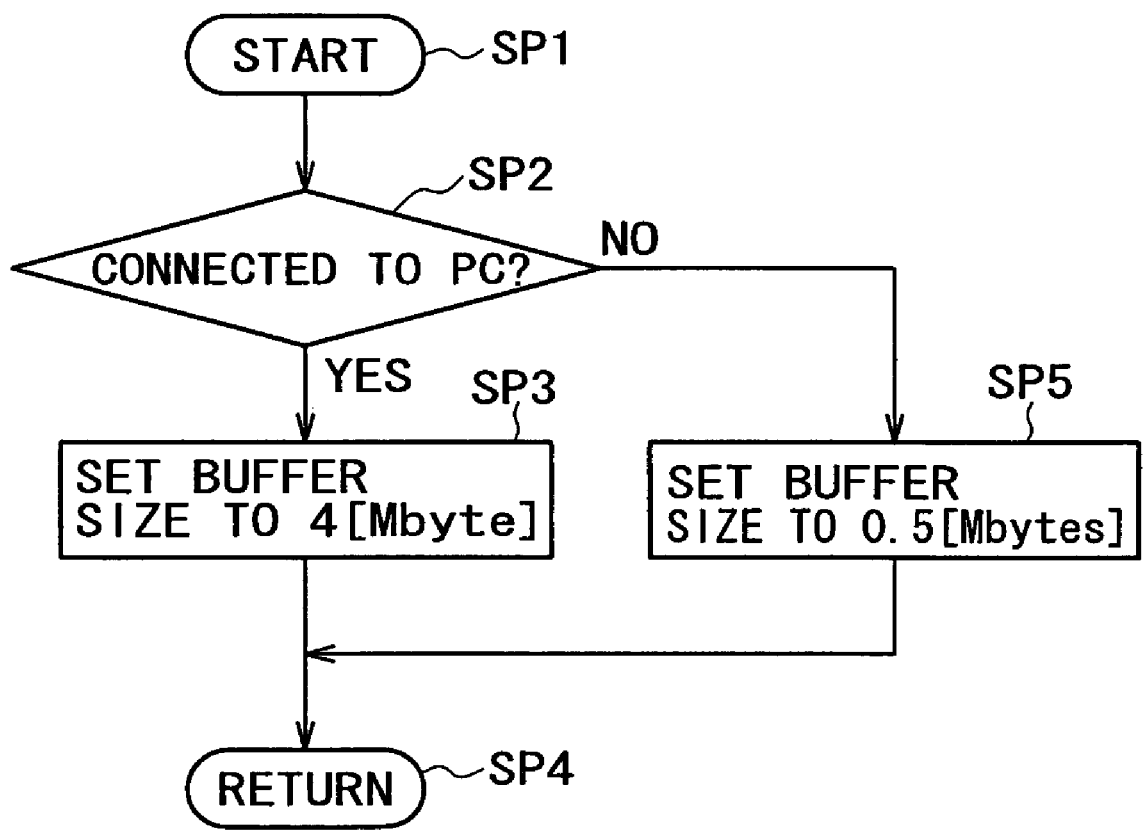
FIG. 8 is a flowchart of a processing sequence of a drive block in the recording apparatus shown in FIG. 4.

While in a data exchange with the personal computer (FIG. 4), in the recording apparatus 11, data input from the interface 24 are temporarily accumulated in the drive buffer 17A and recorded on the hard disk 18, and reproduced data from the hard disk 18 are temporarily accumulated in the drive buffer 17A and output to the personal computer. The drive block 17 makes a decision to set the buffer size of the drive buffer 17A to a larger capacity of 4 [Mbps] (FIG. 8).

After outputting commands for recording or reproducing data, the personal computer sends data to the recording apparatus 11 at a high rate based on a response from the drive block 17, and thereafter can perform another process. Conversely, until a sufficient amount of reproduced data is accumulated in the recording apparatus 11, the personal computer can perform another process, and can acquire the reproduced data from the recording apparatus 11 between such other processes. The recording apparatus 11 can thus send data to and receive data from the computer, can prevent frequent access from the computer, and can have a high affinity with the computer.

For recording streaming data representative of the captured result, the buffer size of the drive buffer 17A is set to 0.5 [Mbytes], thus reducing a capacity required by the system buffer 16A.

Figure 1:
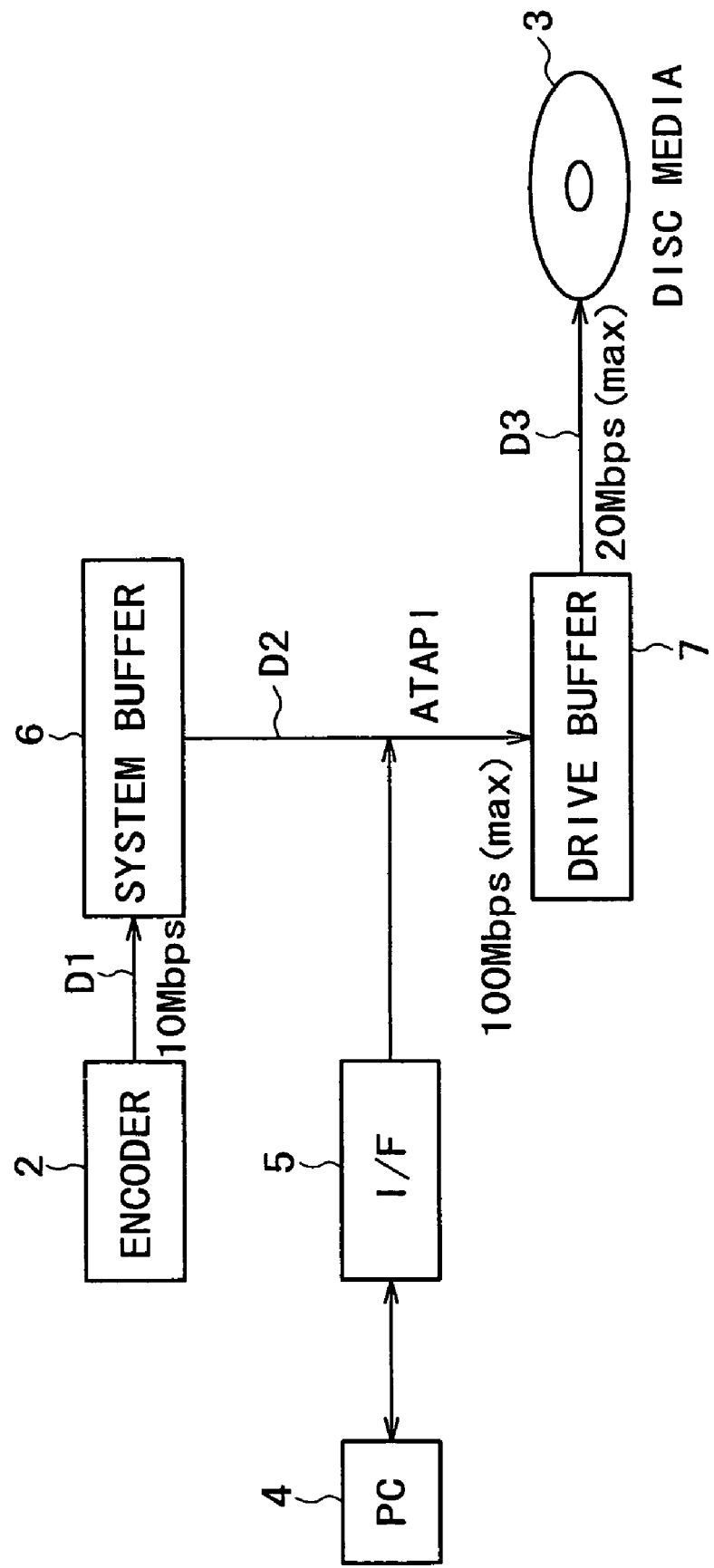
FIG. 1 is a block diagram of an arrangement of a recording apparatus to which a computer can be connected.
Figure 2:
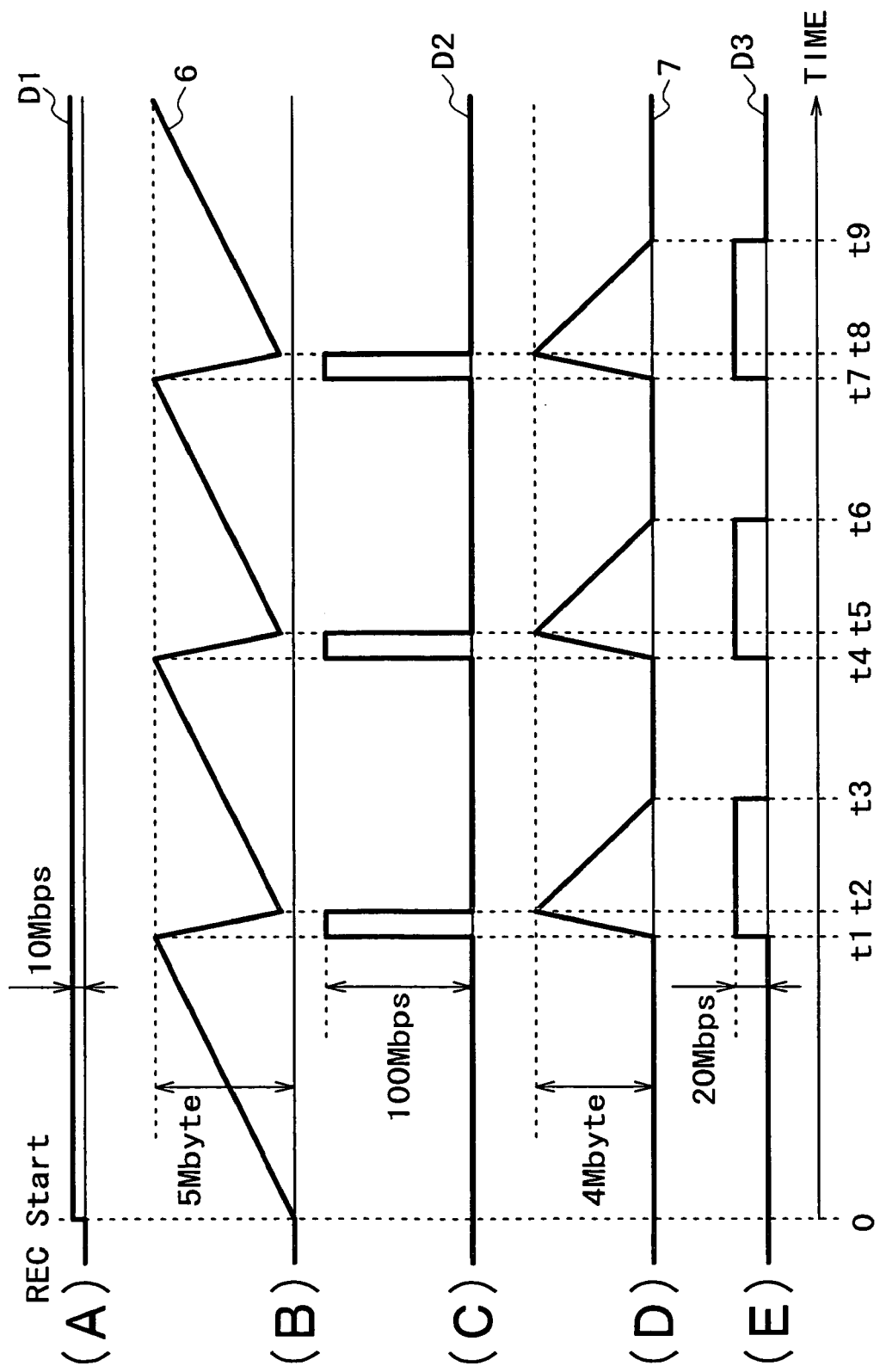
FIG. 2 is a timing chart showing how the amount of data varies in buffers in the recording apparatus shown in FIG. 1.
Figure 9:
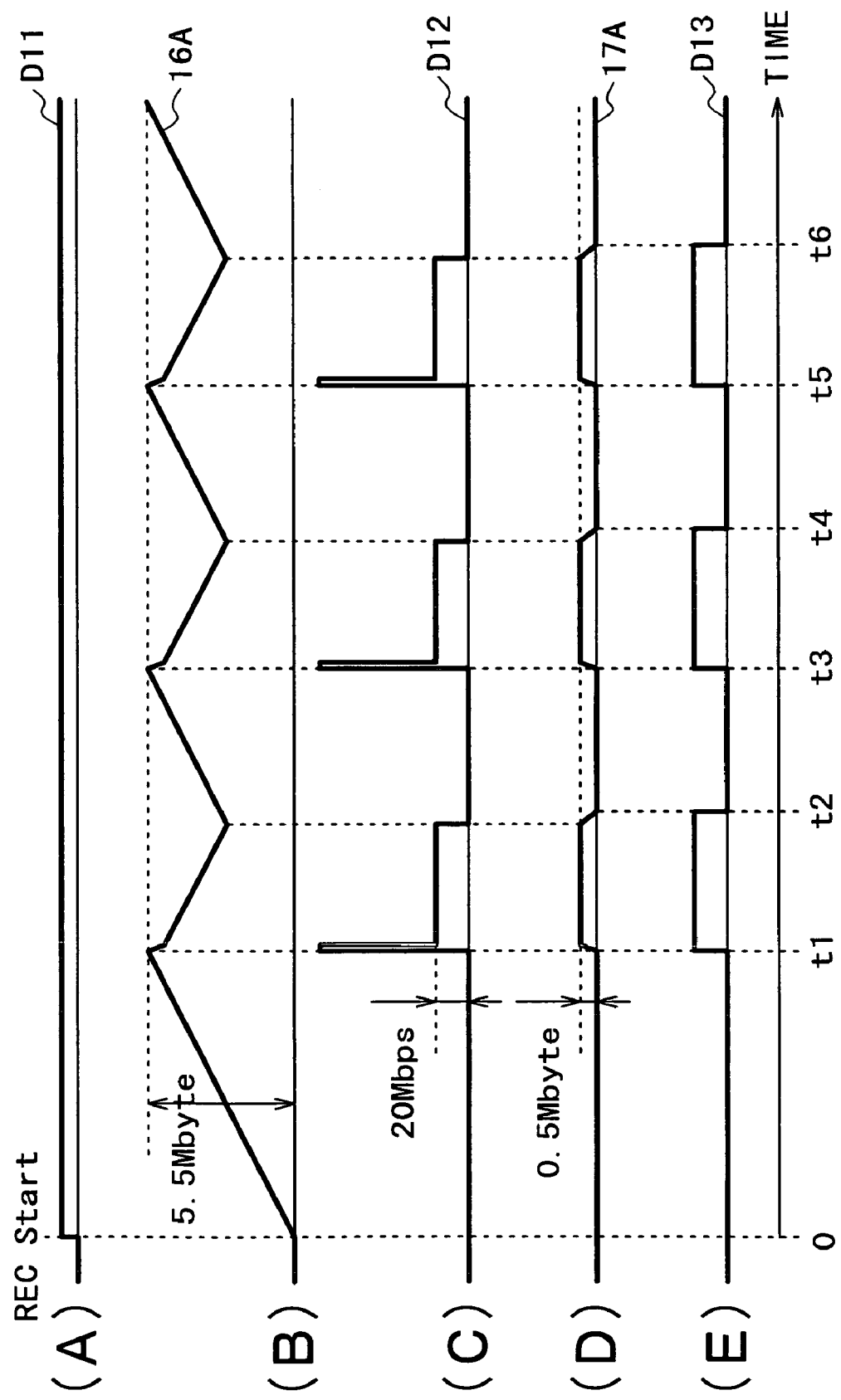
FIG. 9 is a timing chart showing how the amount of data varies in buffers in the recording apparatus shown in FIG. 4.

As shown in FIG. 9 in comparison with FIG. 2, for recording streaming data on the hard disk 18 through the drive buffer 17A at times t1, t3, t5 when the buffer size of the drive buffer 17A is set to 0.5 [Mbytes] and the amount of data in the system buffer 16A is increased to 5 [Mbytes], immediately after the data have started being transferred from the system buffer 16A at time t1, since there is an empty storage area available in the drive buffer 17A, the streaming data are transferred from the system buffer 16A to the drive buffer 17A at a data transfer rate of 100 [Mbps].

The drive buffer 17A records the streaming data thus transferred on the hard disk 18. Since the data streaming data are recorded at a data transfer rate of 20 [Mbps], the drive buffer 17A immediately suffers a lack of empty storage area. The drive block 17 instructs the system block 16 to wait for transferring data through the ATAPI interface. When an empty storage area becomes available in the drive buffer 17A as data are recorded on the hard disk 18, the drive block 17 permits the system block 16 to transfer streaming data.

Thus, in the system buffer 16A, the data transfer rate for the drive block 17 is limited to 20 [Mbps] which is the rate at which data are recorded on the hard disk 18. The drive buffer 17A stores streaming data at 0.5 [Mbps].

Figure 3:
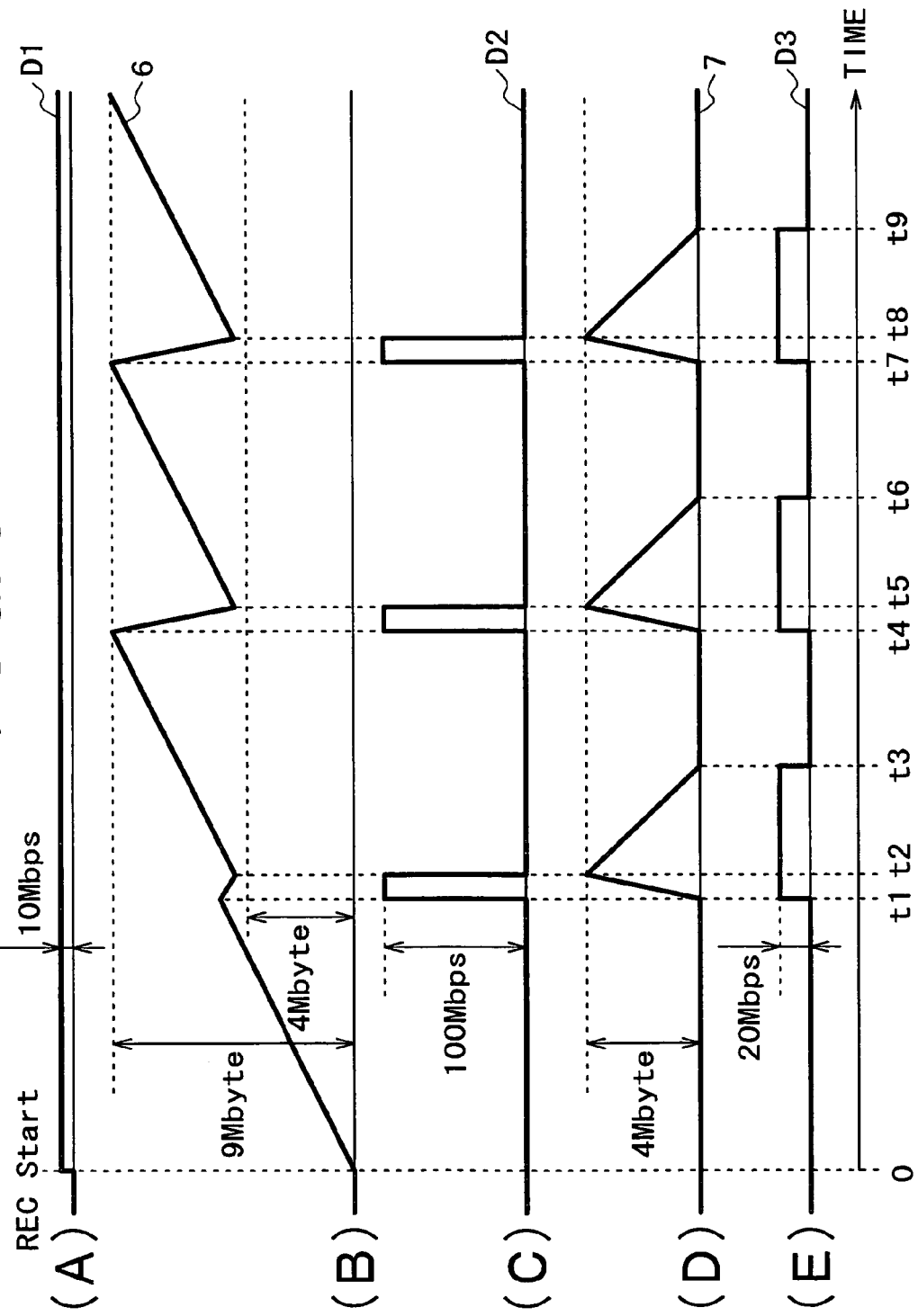
FIG. 3 is a timing chart showing how the amount of data varies in the buffers when an error has occurred.

As shown in FIG. 10 in comparison with FIG. 3, if a resending request is issued from the drive block 17 for streaming data that are sent at time t1, for example, then the system block 16 may resend as much streaming data as stored by the drive block 17, and hence may have a correspondingly reduced storage area required for storing streaming data to be resent. Specifically, as can be seen from a comparison with FIG. 3, the system buffer 16A may have a storage capacity of 5.5 [Mbytes].

According to the present embodiment, therefore, the system buffer 16A has a reduced storage capacity, and hence the overall arrangement of the apparatus may be simplified accordingly.

(3) Effects of the Embodiment:

With the above arrangement, the buffer size of a recording buffer for temporarily storing data and recording the data on a recording medium is switched between a mode for recording data through an interface with a computer and a mode for recording streaming data such as video data or the like, thereby reducing the capacity of the buffer memory even if it is arranged to be able to input data to and output data from the computer to increase its affinity with the computer.

The system block is thus simplified in structure, and, if it is implemented as an integrated circuit, the chip has a reduced area.

(4) Other Embodiments:

In the above embodiment, streaming data produced by processing compressed video data and compressed audio data according to a time-division multiplexing process are recorded. The present invention is not limited to the recording such streaming data, but may be applied to a wide range of applications including the recording of uncompressed video data, the recording of audio data, and so forth.

In the above embodiment, the captured image and sound from the subject are recorded. However, the present invention is not limited to the recording of such data, but may be applied to a wide range of applications including the recording of video data or the like supplied from a line input.

In the above embodiment, the interfaces according to ATAPI, IEEE 1394, and so forth are employed. However, the present invention is not limited to those interfaces, but may be applied to a wide range of applications including various interfaces, if necessary.

In the above embodiments, streaming data are recorded by the hard disk drive. However, the present invention is not limited to the recording of data with the hard disk drive, but may be applied to a wide range of applications including the recording of data with an optical disk drive, a memory card, and so forth.

According to the present invention, as described above, the buffer size of a recording buffer for temporarily storing data and recording the data on a recording medium is switched between a mode for recording data through an interface with a computer and a mode for recording streaming data such as video data or the like, thereby reducing the capacity of the buffer memory even if it is arranged to be able to input data to and output data from the computer to increase its affinity with the computer.

INDUSTRIAL APPLICABILITY

The present invention relates to a recording apparatus and a recording method, and can be applied to a video data recording apparatus having an interface with a computer.

The invention claimed is:

1. A recording apparatus comprising:
an interface connectable to a computer;
a buffer memory for temporarily storing and outputting streaming data at a data transfer rate that is relatively lower than the data transfer rate of said interface; and
recording means for temporarily storing data output from said buffer memory and said interface in a recording buffer and recording the data on a recording medium;
wherein said recording means switches the buffer size of said recording buffer between a mode for recording the data output from said interface on said recording medium and a mode for recording the data output from said buffer memory on said recording medium, wherein the data transfer rate to said recording medium is higher than the data transfer rate of the streaming data, wherein, when said streaming data output from said buffer memory is transferred to said recording buffer to be recorded on said recording medium, said streaming data is recorded intermittently by repeating recording period during which the streaming data is recorded on said recording medium and halt period during which recording of the streaming data is halted, and wherein, during said recording period, the streaming data is transferred to said recording buffer every time when empty storage area becomes available after no empty storage area becomes available by transferring the streaming data to said recording buffer, wherein the buffer size of the recording buffer is switched to a smaller size in the mode for recording the data output from the memory on the recording medium than in the mode for recording the data output from the interface on the recording medium.

* * * * *